(12) United States Patent
Mori

(10) Patent No.: US 7,933,548 B2
(45) Date of Patent: Apr. 26, 2011

(54) CELLULAR PHONE, AND CODEC CIRCUIT AND RECEIVING CALL SOUND VOLUME AUTOMATIC ADJUSTMENT METHOD FOR USE IN CELLULAR PHONE

(75) Inventor: Ukyou Mori, Tokyo (JP)

(73) Assignee: NEC Corporation, Tokyo (JP)

( * ) Notice: Subject to any disclaimer, the term of this patent is extended or adjusted under 35 U.S.C. 154(b) by 544 days.

(21) Appl. No.: 12/091,581

(22) PCT Filed: Oct. 24, 2006

(86) PCT No.: PCT/JP2006/321588
§ 371 (c)(1),
(2), (4) Date: Apr. 25, 2008

(87) PCT Pub. No.: WO2007/049777
PCT Pub. Date: May 3, 2007

(65) Prior Publication Data
US 2009/0124280 A1    May 14, 2009

(30) Foreign Application Priority Data
Oct. 25, 2005 (JP) ................. 2005-310559

(51) Int. Cl.
H04H 40/00 (2008.01)
(52) U.S. Cl. ..................................... 455/3.06
(58) Field of Classification Search ............. 455/550.1, 455/3.06, 403, 414.1, 414.2, 414.3, 414.4, 455/66.1, 556.1, 556.2, 557, 232.1, 569.1, 455/420, 425, 501, 63.1, 222, 223, 570, 135, 455/277.2, 278.1, 283, 296, 310; 370/335, 370/342, 203, 493, 210, 208, 350; 379/406.01, 387.01
See application file for complete search history.

(56) References Cited

U.S. PATENT DOCUMENTS
4,135,159 A * 1/1979 Kubanoff .................. 455/232.1
(Continued)

FOREIGN PATENT DOCUMENTS
JP       05-083208       4/1993
(Continued)

OTHER PUBLICATIONS
Japanese Official Action dated May 7, 2010, together with English-language translation.

*Primary Examiner* — Melody Mehrpour
(74) *Attorney, Agent, or Firm* — Scully, Scott, Murphy & Presser, PC

(57) ABSTRACT

Provided is a cellular phone enabling improvement of the level of a sense of hearing of a pseudo noise which is generated when there exists no voice signal. In the cellular phone, frame type information included in a baseband signal "in" is identified by the frame type identification unit 71 and when the frame type information represents pseudo noise information, a pseudo noise signal generated by the AMR (Adaptive Multi-Rate) decoder 72 with an internal pseudo noise generator is output to the call receiver unit 43 with its level reduced by a predetermined amount by the signal level change amount calculation unit 74 and the signal level change unit 73, while when the frame type information represents a voice signal, the voice signal decoded by the AMR (Adaptive Multi-Rate) decoder 72 with an internal pseudo noise generator is output to the call receiver 43 with its level unchanged.

8 Claims, 8 Drawing Sheets

U.S. PATENT DOCUMENTS

| | | | |
|---|---|---|---|
| 4,365,338 A * | 12/1982 | McRae et al. | 375/230 |
| 4,532,648 A * | 7/1985 | Noso et al. | 704/275 |
| 4,628,529 A * | 12/1986 | Borth et al. | 381/94.3 |
| 5,127,051 A * | 6/1992 | Chan et al. | 375/348 |
| 5,781,553 A * | 7/1998 | Choi et al. | 370/464 |
| 5,937,377 A * | 8/1999 | Hardiman et al. | 704/225 |
| 5,940,025 A * | 8/1999 | Koehnke et al. | 342/159 |
| 5,956,678 A * | 9/1999 | Hab-Umbach et al. | 704/256.4 |
| 6,862,324 B1 * | 3/2005 | Lui et al. | 375/326 |
| 6,862,567 B1 * | 3/2005 | Gao | 704/228 |
| 6,925,108 B1 * | 8/2005 | Miller et al. | 375/150 |
| 7,010,020 B2 * | 3/2006 | Bultan et al. | 375/148 |
| 7,151,792 B2 * | 12/2006 | Shimizu et al. | 375/148 |
| 7,302,385 B2 * | 11/2007 | Sung et al. | 704/219 |
| 7,738,548 B2 * | 6/2010 | Roberts et al. | 375/233 |
| 2001/0014114 A1 * | 8/2001 | Baltersee et al. | 375/148 |
| 2002/0015502 A1 * | 2/2002 | Albus et al. | 381/86 |
| 2002/0118635 A1 * | 8/2002 | Nee | |
| 2002/0181698 A1 * | 12/2002 | Takahashi et al. | 379/406.01 |
| 2004/0258027 A1 * | 12/2004 | Tsybakov et al. | 370/335 |
| 2006/0059001 A1 * | 3/2006 | Ko | 704/273 |
| 2006/0073819 A1 * | 4/2006 | Lowles | 455/418 |
| 2007/0077924 A1 * | 4/2007 | Bhogal et al. | 455/420 |
| 2007/0207817 A1 * | 9/2007 | Mori | 455/456.5 |
| 2009/0103427 A1 * | 4/2009 | Tsybakov et al. | 370/203 |

FOREIGN PATENT DOCUMENTS

| | | |
|---|---|---|
| JP | 2000-115114 | 4/2000 |
| JP | 2003-143254 | 5/2003 |

* cited by examiner (a)

| FRAME TYPE INFORMATION | CONTENTS |
|---|---|
| 0 | AMR VOICE[1] |
| 1 | AMR VOICE[2] |
| 2 | AMR VOICE[3] |
| 3 | AMR VOICE[4] |
| 4 | AMR VOICE[5] |
| 5 | AMR VOICE[6] |
| 6 | AMR VOICE[7] |
| 7 | AMR VOICE[8] |
| 8 | AMR PSEUDO NOISE |
| 9 | GSM PSEUDO NOISE |
| 10 | TDMA PSEUDO NOISE |
| 11 | PDC PSEUDO NOISE |
| 12-14 | NOT USED |
| 15 | INFORMATION OF NO DATA |

(b)

US 7,933,548 B2

CELLULAR PHONE, AND CODEC CIRCUIT AND RECEIVING CALL SOUND VOLUME AUTOMATIC ADJUSTMENT METHOD FOR USE IN CELLULAR PHONE

TECHNICAL FIELD

The present invention relates to a cellular phone, and a codec circuit and a receiving call sound volume automatic adjustment method for use in the cellular phone and, more particularly, to a cellular phone suitable for use in receiving a signal transmitted from a 3GPP (3rd Generation Partnership Project) standard cellular phone on a frame basis, and a codec circuit and a receiving call sound volume automatic adjustment method for use in the cellular phone.

BACKGROUND ART

Codec based on AMR (Adaptive Multi-Rate) as one of voice compression and coding systems widely used for cellular phones is designed to, when there exists no voice signal on a transmission side, transmit pseudo noise information whose data volume is smaller than that of the voice signal without transmitting the voice signal to a reception side, thereby reducing power consumption at the time of a call over a cellular phone.

In this case, the reception side generates a pseudo noise by using the received pseudo noise information and outputs the noise through a call receiver unit (speaker), thereby mitigating a sense of interruption of a call.

FIG. 7 is a block diagram showing an electrical structure of a main part of a cellular phone of this kind.

The cellular phone 1 has a foldable casing formed of an upper unit 10 and a lower unit 20 as shown in FIG. 7. Accommodated in the upper unit 10 are a display unit 11, an antenna 12, a call receiver unit (speaker) 13, a receiving call/charging lamp 14 and a magnet 15. The antenna 12 transmits and receives radio waves to/from a radio base station not shown. The radio waves include a signal transmitted from a cellular phone on the transmission side not shown. The signal is coded based on AMR, one frame of which includes frame type information indicating whether the frame is a voice signal or pseudo noise information corresponding to a case where there exists no such a voice signal. The display unit 11, which is formed of, for example, an LCD (Liquid Crystal Display), displays various pieces of information such as calling party telephone number information and icon information. The call receiver unit 13 generates a voice of a transmission partner and transfers the same to a user. The receiving call/charging lamp 14 blinks in blue when a call arrives and lights in red when in charging. The magnet 15 irradiates magnetism to the lower unit 20 when the upper unit 10 and the lower unit 20 are brought to be closed.

Accommodated in the lower unit 20 are an operation unit 21, a microphone 22, an RF circuit 23, a modulation/demodulation circuit 24, a baseband processing circuit 25, a codec circuit 26, a magnetic sensor 27, a storage unit 28 and a control unit 30. The operation unit 21 is formed of a transmission button, English characters/Japanese syllables/Chinese characters used in Japanese writing/numerals conversion buttons, a power on/off button, a cross button for cursor operation and an end button. The microphone 22 transmits a call upon receiving a user's voice. The RF circuit 23 has a reception circuit, a transmission circuit and a frequency synthesizer not shown.

The modulation/demodulation circuit 24 executes demodulation of received radio waves and modulation of radio waves to be transmitted. The baseband processing circuit 25 takes out an original baseband signal from a demodulation signal output from the modulation/demodulation circuit 24 and supplies the same to the codec circuit 26, as well as taking character data from the demodulation signal and supplying the same to the control unit 30. The codec circuit 26 executes digital/analog conversion (hereinafter, referred to as "D/A conversion") of a baseband signal output from the baseband processing circuit 25 and supplies the obtained signal to the call receiver unit 14, as well as executing D/A conversion of an output signal of the control unit 30. The magnetic sensor 27, which is formed of, for example, Hall elements, generates a magnetism detection signal M when the upper unit 10 and the lower unit 20 are brought to be open to prevent irradiation of magnetism of the magnet 15. The storage unit 28 stores a control program for operating the control unit 30 and data to be displayed on the display unit 11. The control unit 30, which is formed, for example, of a CPU (Central Processing Device), comprises an open state detection unit 31, a line control unit 32 and a display control unit 33 to control the entire cellular phone 1. The open state detection unit 31 detects the magnetism detection signal M of the magnetic sensor 27 to generate an open state detection signal N when the upper unit 10 and the lower unit 20 are brought to be open. The display control unit 33, which is formed of, for example, an LCD driver, drives the display unit 11.

FIG. 8 is a block diagram showing an electrical structure of a main part of the codec circuit 26 in FIG. 7.

The codec circuit 26 has an AMR decoder 26a with an internal pseudo noise generator and a D/A conversion unit 26b. The AMR decoder 26a with an internal pseudo noise generator, when the above-described frame type information included in a baseband signal "in" which is output from the baseband processing circuit 25 represents a voice signal, decodes the voice signal and outputs the obtained signal as a signal e, while when the frame type information represents pseudo noise information, generating a pseudo noise signal corresponding to the pseudo noise information and outputs the obtained signal as the signal e. The D/A conversion unit 26b D/A converts the signal e from the AMR decoder 26a with an internal pseudo noise generator and sends the converted signal as a signal f to the call receiver unit 13.

Among other techniques of this kind than the above-described cellular phone is such a techniques as recited in the following literature.

The voice coding communication system recited in Literature 1, for example, resolves the problem in a sense of hearing because while a transmission side stops transmission during a non-voice period, a pseudo noise generated on a reception side attains approximately the same voice quality and level as those of a background noise sent from the transmission side.

Literature 1: Japanese Patent Laying-Open No. 05-083208 (page 6, FIG. 1)

The above-described cellular phone has the following problems.

More specifically, although from a moment when determination is made that there exists no voice signal for transmission, a cellular phone on a transmission side calculates a pseudo noise level on the transmission side, there is a possibility that a frame in which a voice signal exists will be erroneously determined to be a frame having no voice signal existing. In this case, because a high pseudo noise level is calculated, a level of a pseudo noise signal generated by a cellar phone on a reception side becomes higher than that required, so that a pseudo noise unnatural in terms of a sense of hearing is generated. In general, a lower pseudo noise level is better as long as a user fails to feel interruption of a call. It is therefore unnecessary to faithfully reproduce, on the reception side, a pseudo noise level calculated on the transmission side.

While the voice coding communication system recited in the above-described Literature 1 has a similar object of resolving problems in a sense of hearing, it has a different structure with a pseudo noise on the reception side set to be approximately the same as a background noise on the transmission side.

The present invention, in view of the above-described circumstances, aims to provide a cellular phone which generates a pseudo noise whose level is low within a range in which a user fails to feel a sense of interruption of a call, and a codec circuit and a receiving call sound volume automatic adjustment method for use in the cellular phone.

SUMMARY

According to the present invention, when frame type information represents pseudo noise information, a receiving call sound volume adjustment unit of a codec circuit outputs a generated pseudo noise signal to a sound unit with its level reduced by a predetermined amount, while when the frame type information represents a voice signal, sending a decoded voice signal to the sound unit with its level unchanged, thereby suppressing a noise level of backgrounds, as well as preventing degradation of call quality such as a break of a prefix to improve call quality.

In addition, when the frame type information represents pseudo noise information, a generated pseudo noise signal is sent to the sound unit with its level reduced to the maximum of 6 [dB], so that a sense of interruption of communication can be avoided to generate a pseudo noise natural in terms of a sense of hearing.

Moreover, since when the frame type information represents pseudo noise information, a generated pseudo noise signal is sent to the sound unit with its level reduced in an arithmetical series manner, an unpleasant sense of a call receiving person caused by a drastic signal level change can be improved.

Moreover, since when the frame type information represents pseudo noise information, a generated pseudo noise signal is sent to the sound unit with its level reduced in a geometrical series manner, an unpleasant sense of a call receiving person caused by a drastic signal level change can be improved.

EXEMPLARY EMBODIMENT

Provided are a cellular phone in which a generated pseudo noise signal is output to a call receiver unit with its level reduced by a predetermined amount when frame type information represents pseudo noise information, a codec circuit for use in the cellular phone and a receiving call sound volume automatic adjustment method.

Exemplary Embodiment

Figure 1:
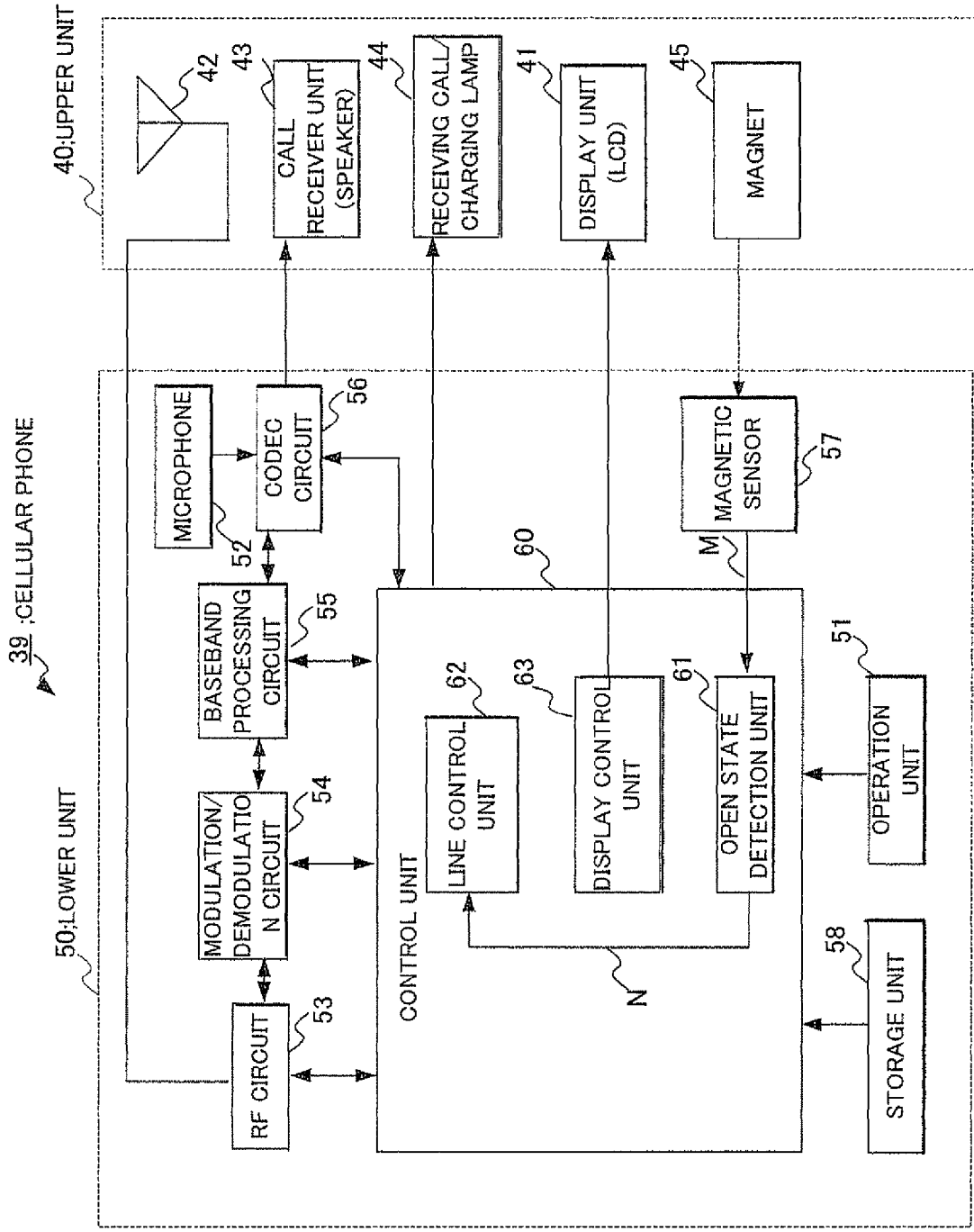
FIG. 1 is a block diagram showing an electrical structure of a main part of a cellular phone according to one exemplary embodiment of the present invention.

FIG. 1 is a block diagram showing an electrical structure of a main part of a cellular phone according to one exemplary embodiment of the present invention.

A cellular phone 39 of this example has a foldable casing formed of an upper unit 40 and a lower unit 50 as shown in the figure. Accommodated in the upper unit 40 are a display unit 41, an antenna 42, a call receiver unit (speaker) 43, a receiving call/charging lamp 44 and a magnet 45. The antenna 42 transmits and receives radio waves to/from a radio base station not shown. The radio waves include a signal transmitted from a cellular phone on a transmission side not shown. The signal is coded based on AMR by the cellular phone on the transmission side, one frame of which includes frame type information indicating whether the frame is a voice signal or pseudo noise information corresponding to a case of no such a voice signal existing. The display unit 41, which is formed of, for example, an LCD, displays various pieces of information such as calling party telephone number information and icon information. The call receiver unit 43 generates a voice of a transmission partner and transfers the same to a user. The receiving call/charging lamp 44 blinks in blue when a call arrives and lights in red when in charging. The magnet 45 irradiates magnetism to the lower unit 50 when the upper unit 40 and the lower unit 50 are brought to be closed.

Accommodated in the lower unit 50 are an operation unit 51, a microphone 52, an RF circuit 53, a modulation/demodulation circuit 54, a baseband processing circuit 55, a codec circuit 56, a magnetic sensor 57, a storage unit 58 and a control unit 60. The operation unit 51 is formed of a transmission button, English characters/Japanese syllables/Chinese characters used in Japanese writing/numerals conversion buttons, a power on/off button, a cross button for cursor operation and an end button. The microphone 52 transmits a call upon receiving a user's voice. The RF circuit 53 has a reception circuit, a transmission circuit and a frequency synthesizer not shown.

The modulation/demodulation circuit 54 executes demodulation of received radio waves and modulation of radio waves to be transmitted. The baseband processing circuit 55 takes out an original baseband signal from a demodulation signal output from the modulation/demodulation circuit 54 and supplies the same to the codec circuit 56, as well as taking out character data from the demodulation signal and supplying the same to the control unit 60. The codec circuit 56, when the above frame type information included in a baseband signal from the baseband processing circuit 55 represents a voice signal, decodes the voice signal, while when the frame type information represents the above pseudo noise information, generating a pseudo noise signal corresponding to the pseudo noise information and executing D/A conversion of the signal to supply the obtained signal to the call receiver unit 44, as well as executing D/A conversion of an output signal of the control unit 60. In this exemplary embodiment, in particular, the codec circuit 56, when the above-described frame type information represents the above-described pseudo noise information, outputs the described above pseudo noise signal generated to the call receiver unit 43 with its level reduced by a predetermined amount, while when the frame type information represents the above-described voice signal, sending the voice signal decoded to the call receiver unit 43 with its level unchanged.

The magnetic sensor 57, which is formed of, for example, Hall elements, generates a magnetism detection signal M when the upper unit 40 and the lower unit 50 are brought to be open to prevent irradiation of magnetism of the magnet 45. The storage unit 58 stores a control program for operating the control unit 60 and data to be displayed on the display unit 11. The control unit 60, which is formed, for example, of a CPU, comprises an open state detection unit 61, a line control unit 62 and a display control unit 63 to control the entire cellular phone 39. The open state detection unit 61 detects the magnetism detection signal M of the magnetic sensor 57 to generate an open state detection signal N when the upper unit 40 and the lower unit 50 are brought to be open. The display control unit 63, which is formed of, for example, an LCD driver, drives the display unit 41.

Figure 2:
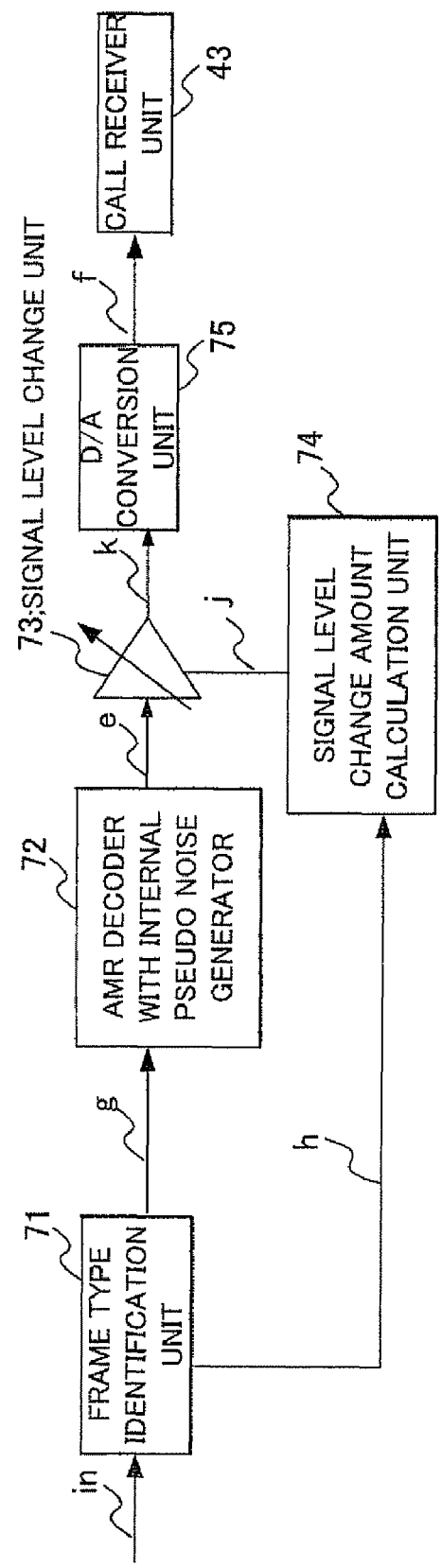
FIG. 2 is a block diagram showing an electrical structure of a main part of a codec circuit 56 in FIG. 1.

FIG. 2 is a block diagram showing an electrical structure of a main part of the codec circuit 56 in FIG. 1.

The codec circuit 56, as shown in FIG. 2, is formed of a frame type identification unit 71, an AMR decoder 72 with an internal pseudo noise generator, a signal level change unit 73, a signal level change amount calculation unit 74 and a D/A conversion unit 75. The frame type identification unit 71, based on frame type information included in a baseband signal "in" which is output from the baseband processing circuit 55, identifies a frame in question as a voice signal or pseudo noise information to generate an identification result h, as well as outputting the baseband signal "in" as a baseband signal g without change. The AMR decoder 72 with an internal pseudo noise generator, when the above-described frame type information included in the baseband signal g output from the frame type identification unit 71 represents a voice signal, decodes the voice signal and outputs the obtained signal as a signal e, while when the frame type information represents pseudo noise information, generating a pseudo noise signal corresponding to the pseudo noise information and outputs the obtained signal as the signal e.

The signal level change amount calculation unit 74, when the identification result h of the frame in question obtained by the frame type identification unit 71 represents the above-described pseudo noise information, generates a signal level control signal j for reducing the level of the pseudo noise signal by a predetermined amount, while when the identification result h represents the above-described voice signal, generating the signal level control signal j for maintaining the level of the voice signal. In this exemplary embodiment, in particular, the signal level change amount calculation unit 74, when the identification result h of the frame in question obtained by the frame type identification unit 71 represents the above-described pseudo noise information, generates the signal level control signal j for reducing the level of the pseudo noise signal to the maximum of 6 [dB]. The signal level change amount calculation unit 74 generates the signal level control signal j for reducing the level of the pseudo noise signal by stages (e.g. arithmetical series or geometrical series). The signal level change unit 73 controls the level of the above-described pseudo noise signal or voice signal and outputs the obtained signal as a signal k based on the signal level control signal j generated by the signal level change amount calculation unit 74. The D/A conversion unit 75 D/A converts the signal k from the signal level change unit 73 and sends the converted signal to the call receiver unit 43 as a signal f.

Figure 3:
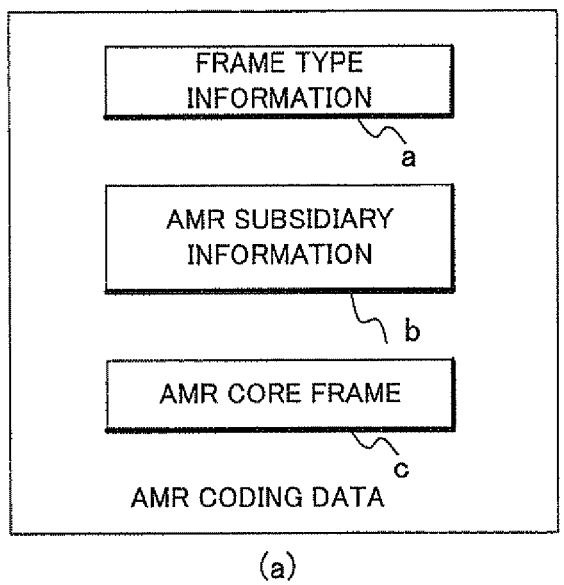
FIG. 3 is a diagram showing a structure of AMR coding data.

FIG. 3 is a diagram showing a structure of AMR coding data, in which (a) is a diagram showing a structure of one frame and (b) is a diagram showing contents of frame type information in (a).

Figure 4:
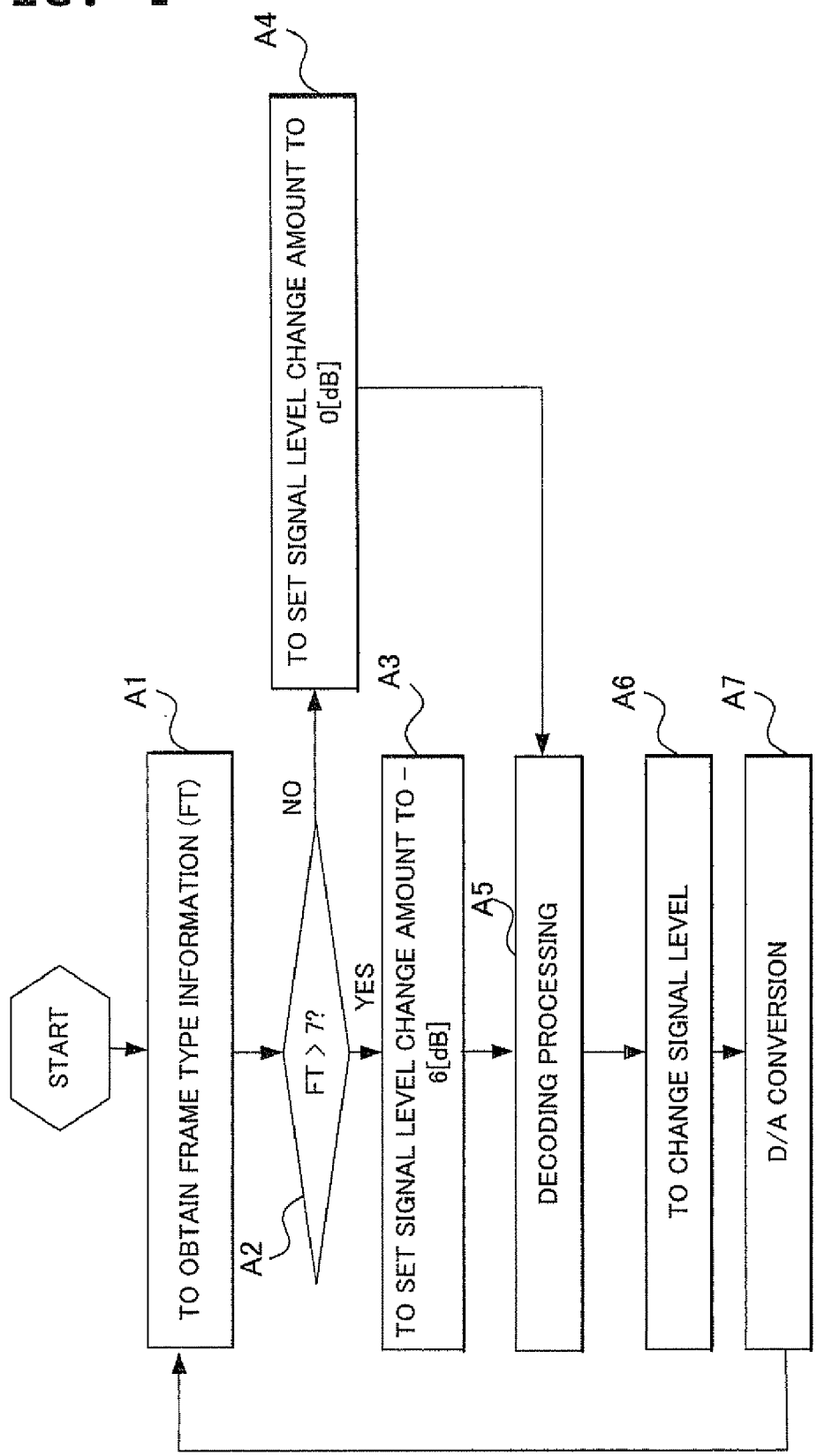
FIG. 4 is a flow chart for use in explaining operation of the codec circuit 56.
Figure 5:
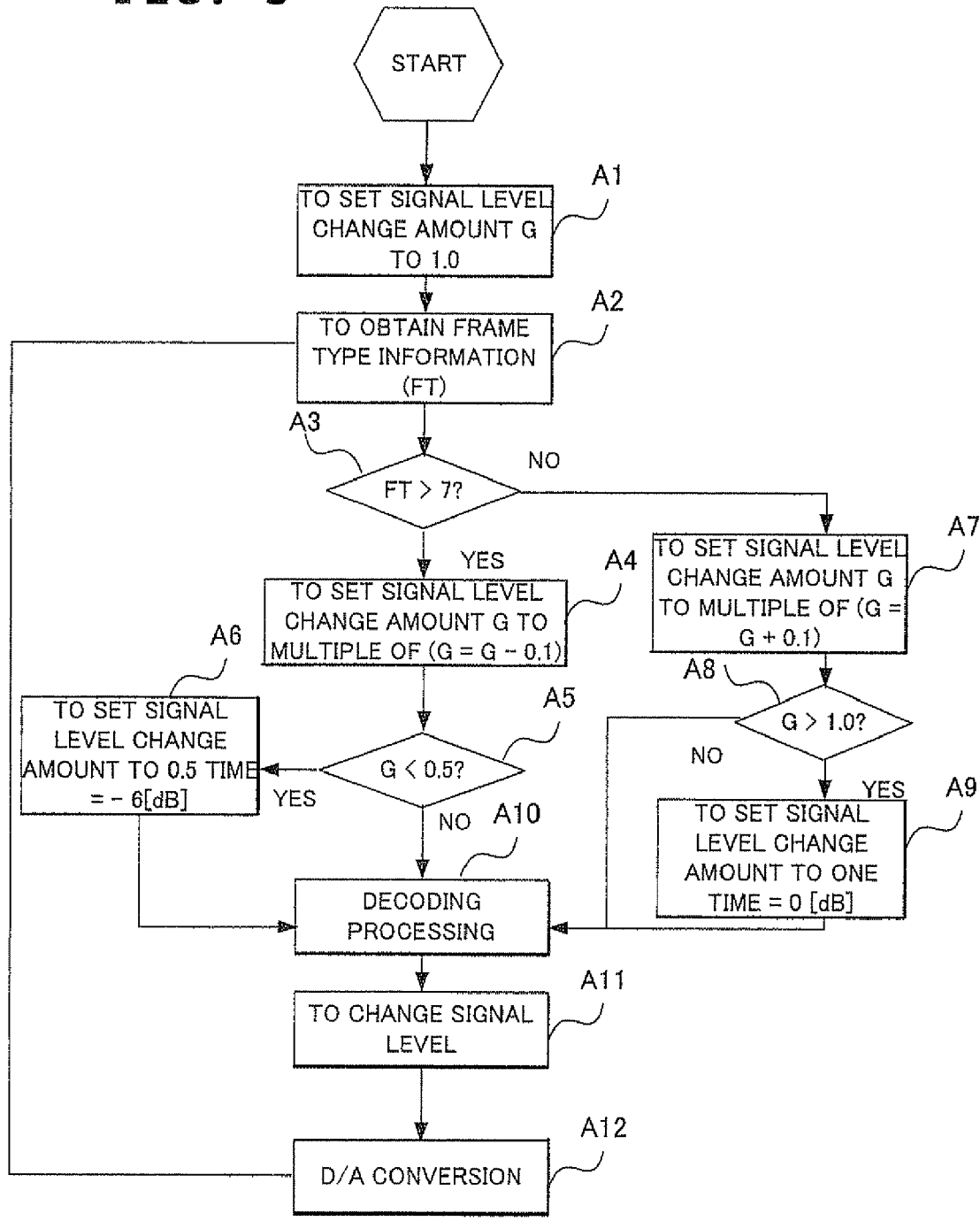
FIG. 5 is a flow chart for use in explaining operation of the codec circuit 56.
Figure 6:
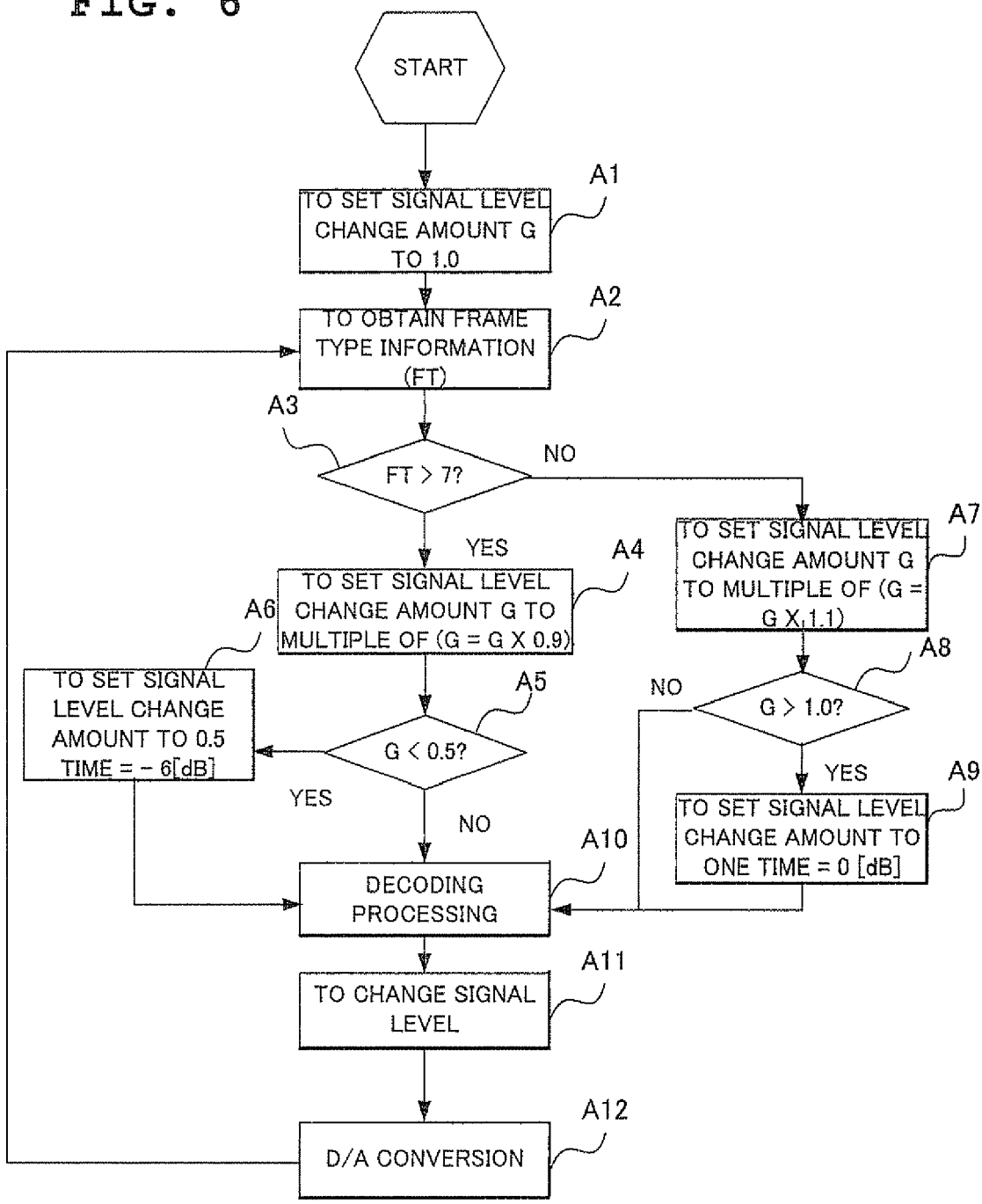
FIG. 6 is a flow chart for use in explaining operation of the codec circuit 56.
Figure 7:
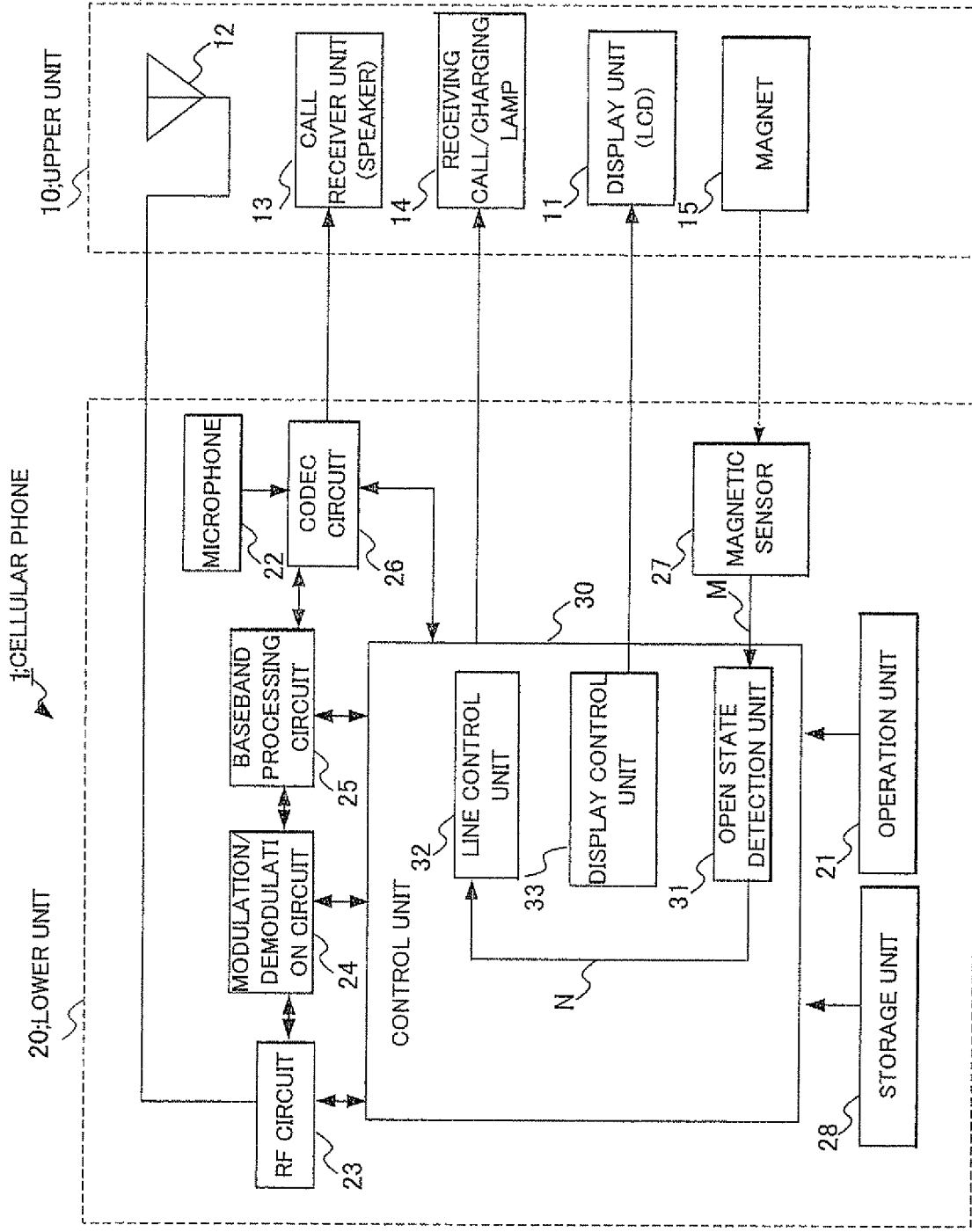
FIG. 7 is a block diagram showing an electrical structure of a main part of a cellular phone according to related art.
Figure 8:
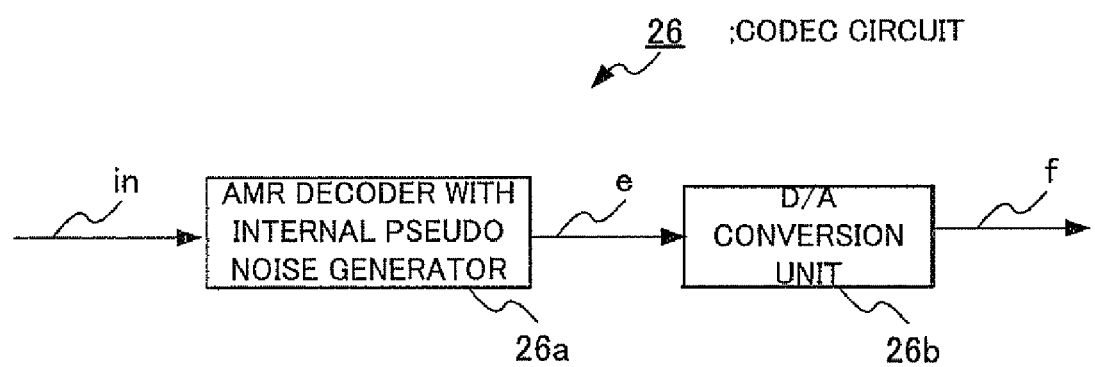
FIG. 8 is a block diagram showing an electrical structure of a main part of a codec circuit 26 in FIG. 7.

FIG. 4, FIG. 5 and FIG. 6 are flow charts for use in explaining operation of the codec circuit 56.

With reference to these figures, description will be made of processing contents of a receiving call sound volume automatic adjustment method for use in the cellular phone of this example.

In the cellular phone, frame type information included in the baseband signal "in" output from the baseband processing circuit 55 is identified by the frame type identification unit 71 and when the frame type information represents pseudo noise information, a pseudo noise signal generated by the AMR decoder 72 with an internal pseudo noise generator is output to the call receiver unit 43 with its level reduced by a predetermined amount by the signal level change amount calculation unit 74 and the signal level change unit 73, while when the frame type information represents a voice signal, the voice signal decoded by the AMR decoder 72 with an internal pseudo noise generator is output to the call receiver unit 43 with its level unchanged.

More specifically, as shown in FIG. 4, frame type information (FT) is obtained by the frame type identification unit 71 (Step A1). The frame type information (FT) is information included in AMR coding data sent from the cellular phone on the transmission side. As shown in FIG. 3($a$), the AMR coding data is formed of frame type information a, AMR subsidiary information b and AMR core frame c. The data structure, which is called an AMR codec frame format 1, is standardized by 3GPP (3rd Generation Partnership Project) as an international standardization organization. 3GPP is a group which advances standardization work related to MC-CDMA based on the North American system (CDMA2000) among standards for third-generation mobile communication, The AMR coding data is standardized by 3GPP to be transmitted on a 20 [ms] basis from the transmission side. Included in the AMR core frame c are coded voice data and pseudo noise information. Included in the AMR subsidiary information b is other data. The frame type information a is formed of contents of frame type information corresponding to each of numerals "0" to "15" as shown in FIG. 3 ($b$). Such corresponding relationship is also standardized by 3GPP.

Next, the frame type identification unit 71 identifies the frame type information as being not less than "8" or less and sends the identification result h to the signal level change amount calculation unit 74 (Step A2). In this case, when the frame type information is not less than "8" (in other words, when the information is pseudo noise information), the signal level control signal j is sent from the signal level change amount calculation unit 74 to the signal level change unit 73 to set a signal level change amount to −6 [dB] (Step A3). When the frame type information is not more than "7" (i.e. voice signal) at Step A2, the signal level control signal j is sent from the signal level change amount calculation unit 74 to the signal level change unit 73 to set the signal level change amount to 0 [dB] (Step A4).

Next, when the frame type information included in the baseband signal g which is output from the frame type identification unit 71 represents a voice signal, the voice signal is decoded by the AMR decoder 72 with an internal pseudo noise generator and output as the signal e. When the frame type information represents pseudo noise information, a pseudo noise signal corresponding to the pseudo noise information is generated and output as the signal e (Step A5). The signal e obtained as a result of decoding of the voice signal is output as the signal k by the signal level change unit 73 with its voice signal level maintained based on the signal level control signal j. The signal e formed of the pseudo noise signal is output as the signal k by the signal level change unit 73 with its pseudo noise signal level reduced by 6 [dB] based on the signal level control signal j (Step A6). The signal k is D/A converted by the D/A conversion unit 75 and sent out to the call receiver unit 43 as the signal f (Step A7). Thereafter, return to Step A1, the same processing will be executed with respect to subsequent coding data.

Thus, before the AMR coding data is decoded, determination is made whether the content of the AMR coding data is pseudo noise information or a voice signal from frame type information included in the AMR coding data and when the frame type information represents pseudo noise information, a generated pseudo noise signal is output to the call receiver unit 43 with its level reduced by 6 [dB], while when the frame type information represents a voice signal, the decoded voice signal is output to the call receiver unit 43 with its level unchanged, so that a background noise level is suppressed, while avoiding degradation of quality of a call such as a break of a prefix, thereby improving call quality.

In addition, when the signal level change amount calculation unit 74 generates the signal level control signal j for reducing a pseudo noise signal level in an arithmetical series manner, a signal level change amount G at the signal level change amount calculation unit 74 is set to be G=1.0 as shown in FIG. 5 (Step A1). Next, the frame type identification unit 71 obtains frame type information (FT) (Step A2). Next, the frame type identification unit 71 identifies the frame type information as being not less than "8" or less to send the identification result h to the signal level change amount calculation unit 74 (Step A3) In this case, when the frame type information is not less than "8" (i.e. pseudo noise information), the signal level control signal j is sent from the signal level change amount calculation unit 74 to the signal level change unit 73 to set the signal level change amount G to be G−0.1 (Step A4).

Next, the signal level change amount calculation unit 74 checks whether the signal level change amount G is less than 0.5 or not (Step A5). When the signal level change amount G is less than 0.5, the signal level control signal j is sent to the signal level change unit 73 so as to bring the signal level change amount G to be 0.5 (=−6 [dB]) (Step A6). Also when at Step A3, the frame type information represents not more than "7" (i.e. voice signal), the signal level control signal j is sent to the signal level change unit 73 from the signal level change amount calculation unit 74 to set the signal level change amount G to be G+0.1 (Step A7). Next, the signal level change amount calculation unit 74 checks whether the signal level change amount G exceeds 1.0 or not (Step A8). When the signal level change amount G exceeds 1.0, the signal level control signal j is sent to the signal level change unit 73 to set the signal level change amount G to be 1.0 (=0 [dB]) (Step A9).

Next, when the frame type information included in the baseband signal g which is output from the frame type identification unit 71 represents a voice signal, the voice signal is decoded and output as the signal e by the AMR decoder 72 with an internal pseudo noise generator. When the frame type information represents pseudo noise information, a pseudo noise signal corresponding to the pseudo noise information is generated and output as the signal e (Step A10). The signal e obtained by decoding the voice signal is output as the signal k by the signal level change unit 73 with its voice signal level maintained based on the signal level control signal j.

The signal e formed of a pseudo noise signal is output by the signal level change unit 73 with the pseudo noise signal level reduced in an arithmetical series manner based on the signal level control signal j (Step A11). The signal k is D/A converted by the D/A conversion unit 75 and sent to the call receiver unit 43 as the signal f (Step A12). Thereafter, return to Step A1 to execute the same processing with respect to subsequent coding data.

Thus, since when the frame type information represents pseudo noise information, a generated pseudo noise signal is output to the call receiver unit 43 with its level reduced in an arithmetical series manner, an unpleasant sense of a person who receives a call which is caused by a drastic signal level change can be improved.

When the signal level change amount calculation unit 74 generates the signal level control signal j for reducing the level of the pseudo noise signal in an arithmetical series manner, the signal level control signal j from the signal level change amount calculation unit 74 is sent to the signal level change unit 73 to set the signal level change amount G to be G×0.9 at Step A4 as shown in FIG. 6. Also at Step A7, the signal level control signal j from the signal level change amount calculation unit 74 is sent to the signal level change unit 73 to set the signal level change amount G to be G×0.1. For the remaining part, the same processing as that of FIG. 5 is executed. Thus, when the frame type information represents pseudo noise information, a generated pseudo noise signal is output to the call receiver unit 43 with its level reduced in an arithmetical series manner, so that an unpleasant sense of a person who receives a call which is caused by a drastic signal level change can be improved.

Although the exemplary embodiment of the present invention has been described in detail in the foregoing with reference to the drawings, a specific structure is not limited to the present exemplary embodiment and design change and the like within a range not departing from the gist of the present invention are included in the present invention.

For example, although the signal level change amount is set to be −6 [dB] at Step A3 in FIG. 4, it need not be −6 [dB] and may be a smaller change amount for mitigating a sense of interruption of communication. It is, however, desirable to set the maximum change amount to be −6 [dB] for avoiding a sense of interruption of communication as well as generating a pseudo noise natural in terms of a sense of hearing. In addition, although at Step A4 in FIG. 5, each change amount of the signal level change amount G is set to be 0.1, it need not be 0.1. Although at Step A5 in FIG. 5, the maximum value of the signal level change amount is set to be 0.5, it need not be 0.5 and a change amount designated at Step A6 may be any arbitrary numerical value as long as it coincides with the maximum value determined at Step A5. Although each change amount of a signal level change amount is 0.1 at Step A7 in FIG. 5, it need not be 0.1.

Although at Step A4 in FIG. 6, each change amount of the signal level change amount G is set to be 0.9, it need not be 0.9. Although at Step A5 in FIG. 6, the maximum value of the signal level change amount G is set to be 0.5, it need not be 0.5 and a change amount designated at Step AG may take any arbitrary numerical value as long as it coincides with the maximum value determined at Step A5. Although at Step A7 in FIG. 6, each change amount of the signal level change amount G is set to be 1.1, it need not be 1.1. In addition, as a structure of the cellular phone 39 shown in FIG. 1, other structure may be used as long as it has the functions of the codec circuit 56.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INCORPORATION BY REFERENCE

This application is based upon and claims the benefit of priority from Japanese patent application No. 2005-310559, filed on Oct. 25, 2005, the disclosure of which is incorporated herein in its entirety by reference.

INDUSTRIAL APPLICABILITY

The present invention is applicable to cellular phones in general having a codec which receives, from a cellular phone on a transmission side, a signal including frame type information indicating on a frame basis whether a frame in question represents a voice signal or pseudo noise information corresponding to a case of no relevant voice signal existing and when there exists no voice signal from the transmission side, generates a pseudo noise.

The invention claimed is:

1. A cellular phone which has a reception unit for receiving a signal including frame type information which represents on a frame basis whether a frame in question is a voice signal or pseudo noise information corresponding to a case of no relevant voice signal existing, a codec circuit for, when said frame type information included in said signal received by the reception unit represents said voice signal, decoding the voice signal, while when the frame type information represents said pseudo noise information, generating a pseudo noise signal corresponding to the pseudo noise information, and a sound unit for generating, upon input of said voice signal decoded by the codec circuit, a voice corresponding to the voice signal, while upon input of said pseudo noise signal generated by the codec circuit, generating a pseudo noise corresponding to the pseudo noise signal, wherein said codec circuit includes
    a receiving call sound volume adjustment unit which, when said frame type information represents said pseudo noise information, sends said pseudo noise signal generated to said sound unit with the signal level reduced by a predetermined amount, while when said frame type information represents said voice signal, sending said voice signal decoded to said sound unit with the signal level unchanged.

2. The cellular phone according to claim 1, wherein said receiving call sound volume adjustment unit comprises
    a frame type identification unit for identifying a frame in question as said voice signal or said pseudo noise information based on said frame type information,
    a signal level change amount calculation unit for generating a signal level control signal for reducing a level of said pseudo noise signal by a predetermined amount when an identification result of the frame in question obtained by the frame type identification unit represents said pseudo noise information, while generating said signal level control signal for maintaining the level of said voice signal unchanged when the identification result indicates said voice signal, and
    a signal level change unit for controlling the level of said pseudo noise signal or said voice signal based on said signal level control signal generated by the signal level change amount calculation unit and sending the controlled signal to said sound unit.

3. The cellular phone according to claim 2, wherein said signal level change amount calculation unit is structured to generate said signal level control signal for reducing the level of said pseudo noise signal to the maximum of 6 [dB] when an identification result of the frame in question obtained by said frame type identification unit represents said pseudo noise information.

4. The cellular phone according to claim 3, wherein said signal level change amount calculation unit is structured to generate said signal level control signal for reducing the level of said pseudo noise signal by stages.

5. The cellular phone according to claim 4, wherein said signal level change amount calculation unit is structured to generate said signal level control signal for reducing the level of said pseudo noise signal in an arithmetical series manner.

6. The cellular phone according to claim 4, wherein said signal level change amount calculation unit is structured to generate said signal level control signal for reducing the level of said pseudo noise signal in a geometrical series manner.

7. For use in a cellular phone which has a reception unit for receiving a signal including frame type information which represents on a frame basis whether a frame in question is a voice signal or pseudo noise information corresponding to a case of no relevant voice signal existing and a sound unit, a codec circuit which, when said frame type information included in said signal received represents said voice signal, decodes the voice signal and sends the obtained signal to said sound unit, while when the frame type information represents said pseudo noise information, generating a pseudo noise signal corresponding to the pseudo noise information and sends the generated signal to said sound unit, which includes
    a receiving call sound volume adjustment unit which, when said frame type information represents said pseudo noise information, sends said pseudo noise signal generated to said sound unit with the signal level reduced by a predetermined amount, while when said frame type information represents said voice signal, sending said voice signal decoded to said sound unit with the signal level unchanged.

8. A receiving call sound volume automatic adjustment method of a cellular phone which has a reception unit for receiving a signal including frame type information which represents on a frame basis whether a frame in question is a voice signal or pseudo noise information corresponding to a case of no relevant voice signal existing, a codec circuit for, when said frame type information included in said signal received by the reception unit represents said voice signal, decoding the voice signal, while when the frame type information represents said pseudo noise information, generating a pseudo noise signal corresponding to the pseudo noise information, and a sound unit for generating, upon input of said voice signal decoded by the codec circuit, a voice corresponding to the voice signal, while upon input of said pseudo noise signal generated by the codec circuit, generating a pseudo noise corresponding to the pseudo noise signal, wherein
    when said frame type information represents said pseudo noise information, said pseudo noise signal generated is sent to said sound unit with the signal level reduced by a predetermined amount, while when said frame type information represents said voice signal, said voice signal is decoded and sent to said sound unit with the signal level unchanged.

\* \* \* \* \*